United States Patent
Singhal et al.

(10) Patent No.: US 10,860,240 B2
(45) Date of Patent: Dec. 8, 2020

(54) INSTANT RESTORE AND INSTANT ACCESS OF HYPER-V VMS AND APPLICATIONS RUNNING INSIDE VMS USING DATA DOMAIN BOOSTFS

(71) Applicant: EMC IP Holding Company LLC, Hopkinton, MA (US)

(72) Inventors: Upanshu Singhal, Bangalore (IN); Ravi V. Chitloor, Bangalore (IN); Shelesh Chopra, Bangalore (IN); Archit Seth, Bangalore (IN); Manish Sharma, Bangalore (IN); Sunil Yadav, Bangalore (IN); Abhishek Sharma, Kota (IN)

(73) Assignee: EMC IP Holding Company LLC, Hopkinton, MA (US)

(*) Notice: Subject to any disclaimer, the term of this patent is extended or adjusted under 35 U.S.C. 154(b) by 171 days.

(21) Appl. No.: 16/028,729

(22) Filed: Jul. 6, 2018

(65) Prior Publication Data
US 2020/0012434 A1   Jan. 9, 2020

(51) Int. Cl.
*G06F 3/06* (2006.01)
*G06F 9/455* (2018.01)

(52) U.S. Cl.
CPC .............. *G06F 3/065* (2013.01); *G06F 3/067* (2013.01); *G06F 3/0608* (2013.01); *G06F 3/0619* (2013.01); *G06F 3/0664* (2013.01); *G06F 9/45558* (2013.01); *G06F 2009/45583* (2013.01)

(58) Field of Classification Search
CPC ... G06F 9/45558; G06F 11/1453; G06F 3/065
See application file for complete search history.

(56) References Cited

U.S. PATENT DOCUMENTS

| | | | |
|---|---|---|---|
| 9,280,423 B1 * | 3/2016 | Mam ................... | G06F 11/1469 |
| 9,547,562 B1 | 1/2017 | Feathergill et al. | |
| 9,977,704 B1 | 5/2018 | Chopra et al. | |
| 10,114,705 B1 * | 10/2018 | Kumar ................ | G06F 11/1469 |
| 2015/0331757 A1 | 11/2015 | Durge et al. | |
| 2019/0369901 A1 * | 12/2019 | Dornemann .......... | G06F 3/0647 |

OTHER PUBLICATIONS

Extended European Search Report issued in corresponding European Application No. 19183596.6, dated Jan. 16, 2020.

* cited by examiner

*Primary Examiner* — Ramon A. Mercado
(74) *Attorney, Agent, or Firm* — Chamberlain, Hrdlicka, White, Williams & Aughtry

(57) ABSTRACT

A production host for hosting virtual machines includes a persistent storage a backup storage client, and a production agent. The persistent storage stores data associated with a portion of the virtual machines. The backup storage client provides access to second data associated with a second portion of the virtual machines stored in a backup storage. The production agent identifies an instant access request for a virtual machine and, in response to identifying the instant access request, generates instant access virtual machine data in the backup storage using a portion of the second data associated with the virtual machine; locally mounts the generated instant access virtual machine data; locally instantiates the virtual machine using the instant access virtual machine data; and executes the instantiated virtual machine using the instant access virtual machine data.

20 Claims, 11 Drawing Sheets

INSTANT RESTORE AND INSTANT ACCESS OF HYPER-V VMS AND APPLICATIONS RUNNING INSIDE VMS USING DATA DOMAIN BOOSTFS

BACKGROUND

Computing devices generate, use, and store data. The data may be, for example, images, documents, webpages, or meta-data associated with the data. The data may be stored on a persistent storage. Stored data may be deleted from the persistent storage.

A backup of the data stored on a computing device may be backed up by storing it on a second computing device. The second computing device may be geographically separated from the computing device.

SUMMARY

In one aspect, a production host for hosting virtual machines in accordance with one or more embodiments of the invention includes a persistent storage a backup storage client, and a production agent. The persistent storage stores data associated with a portion of the virtual machines. The backup storage client provides access to second data associated with a second portion of the virtual machines stored in a backup storage. The production agent identities an instant access request for a virtual machine and, in response to identifying the instant access request, generates instant access virtual machine data in the backup storage using a portion of the second data associated with the virtual machine; locally mounts the generated instant access virtual machine data; locally instantiates the virtual machine using the instant access virtual machine data; and executes the instantiated virtual machine using the instant access virtual machine data.

In one aspect, a method for hosting virtual machines by a production host in accordance with one or more embodiments of the invention includes identifying an instant access request for a virtual machine and, in response to identifying the instant access request, generating instant access virtual machine data in a backup storage using a portion of data associated with the virtual machine; locally mounting the generated instant access virtual machine data; locally instantiating the virtual machine using the instant access virtual machine data; and executing the instantiated virtual machine using the instant access virtual machine data.

In one aspect, a non-transitory computer readable medium in accordance with one or more embodiments of the invention includes computer readable program code, which when executed by a computer processor enables the computer processor to perform a method for hosting virtual machines by a production host. The method includes identifying an instant access request for a virtual machine and, in response to identifying the instant access request, generating instant access virtual machine data in a backup storage using a portion of data associated with the virtual machine; locally mounting the generated instant access virtual machine data; locally instantiating the virtual machine using the instant access virtual machine data; and executing the instantiated virtual machine using the instant access virtual machine data.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for restoring virtual machines. More specifically, the systems, devices, and methods may multiple methods of performing a restoration. Depending on the importance of the virtual machine, one of the methods may be preferentially selected over the other methods.

In one or more embodiments of the invention, the system performs an instant access restoration for high importance virtual machines. In an instant access restoration, backup data from a backup storage may not be transferred to a location where a to-be-restored virtual machine will execute. Rather, the backup data may be stored in a backup storage and access to the backup data may be provided to the to-be-restored virtual machine remotely. By doing so, embodiments of the invention may substantially reduce the time required to perform a virtual machine restoration.

Figure 1:
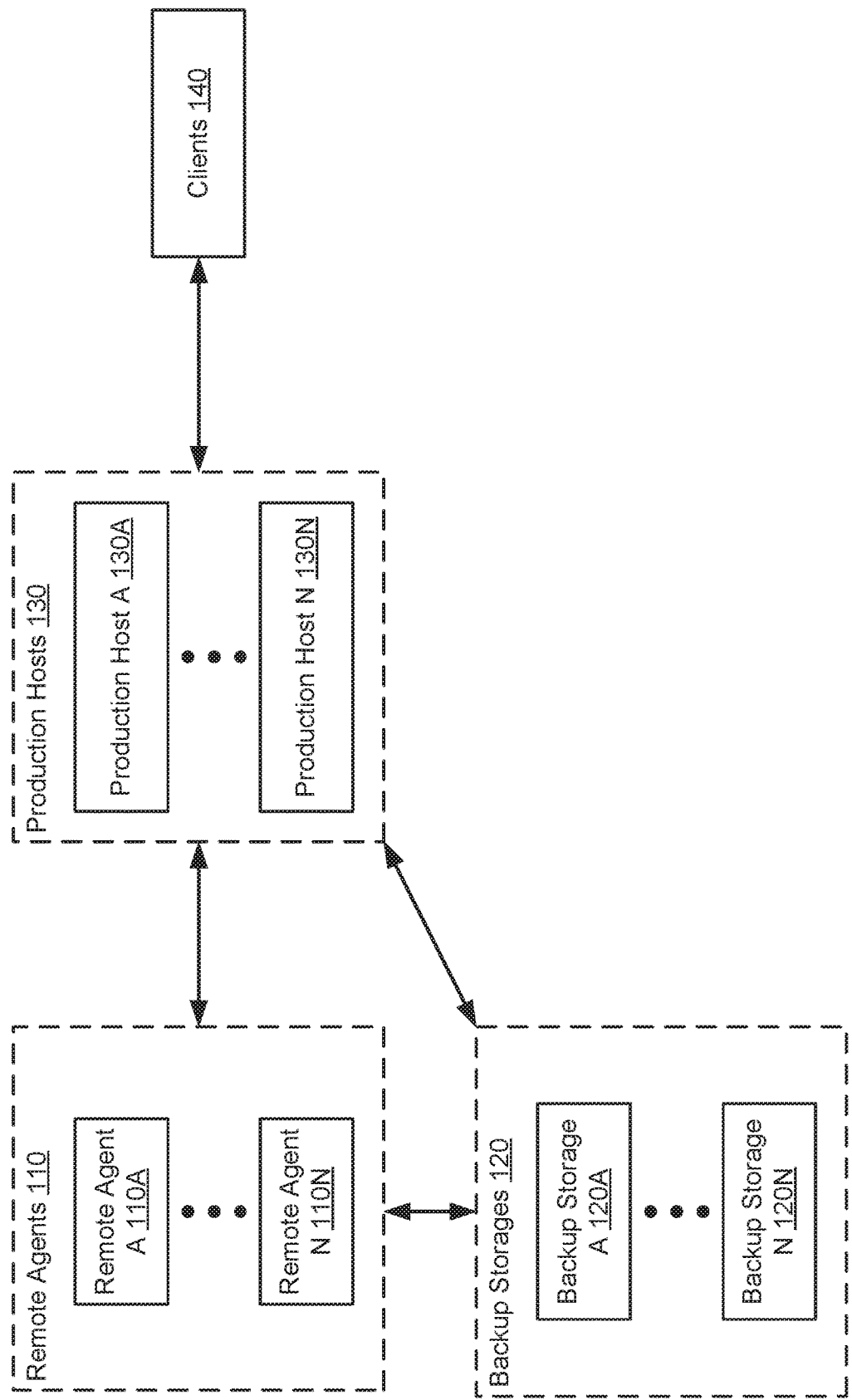
FIG. 1 shows a diagram of a system in accordance with one or more embodiments of the invention.

FIG. 1 shows an example system in accordance with one or more embodiments of the invention. The system may include production hosts (130) that host virtual machines exposed to clients (140). The system may further include remote agents (110) that provide services to the production hosts. The services may include data storage in backup storages (120) and restorations of virtual machines using the data stored in the backup storages (120). In one or more embodiments of the invention, restoring a virtual machine may generate an instant access virtual machine. An instant access virtual machine may use backup storages (120) its storage resources and production hosts for its computation and memory resources. By doing so, the virtual machine may be restored much more quickly when compared to restoring a virtual machine in a manner that utilizes production hosts for storage resources. Each component of the system of FIG. 1 may be operably connected via any combination of wired and wireless connections. Each component of the system is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (140) may be other types of computing devices without departing from the invention. For additional details regarding computing devices, See FIG. 6.

The clients (140) may interact with virtual machines hosted by the production hosts (130). For example, the virtual machines may host databases, email servers, or any other type of application. The clients (140) may utilize services provided by these or other applications. In another example, the clients (140) may directly operate the virtual machines, e.g., a virtualized environment. In such a scenario, the clients (140) may operate as terminals for accessing the virtual machines.

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The production hosts (130) may be other types of computing devices without departing from the invention. For additional details regarding computing devices, See FIG. 6.

In one or more embodiments of the invention, the production hosts (130) are distributed computing devices. As used herein, a distributed computing device refers to functionality provided by a logical device that utilizes the computing resources of one or more separate and/or distinct computing devices. For example, in one or more embodiments of the invention, the production hosts (130) may be distributed devices that include components distributed across a number of separate and/or distinct computing devices. In such a scenario, the functionality of the production hosts (130) may be performed by multiple different computing devices without departing from the invention.

In one or more embodiments of the invention, the production hosts (130) host virtual machines. The production hosts (130) may host any number of virtual machines without departing from the invention. The production hosts (130) may also host agents, or other executing components, for orchestrating the operation of the hosted virtual machines.

In one or more embodiments of the invention, the virtual machines hosted by the production hosts (130) may be restored at different points in time. For example, a virtual machine that becomes corrupted may be restored to continue to provide services to the clients (140). In another example, a production host hosting a virtual machine may become inoperable due to a disaster or other event. In such a scenario, the virtual machines hosted by the inoperable production host may be restored on other production hosts. For additional details regarding the production hosts (130), See FIG. 2A.

In one or more embodiments of the invention, the remote agents (110) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of remote agents (110) described in this application and all, or a portion thereof, of the methods illustrated in FIGS. 4A-4C. The remote agents (110) may be other types of computing devices without departing from the invention. For additional details regarding computing devices, See FIG. 6.

In one or more embodiments of the invention, the remote agents (110) are distributed computing devices. As used herein, a distributed computing device refers to functionality provided by a logical device that utilizes the computing resources of one or more separate and/or distinct computing devices. For example, in one or more embodiments of the invention, the remote agents (110) may be distributed devices that include components distributed across a number of separate and/or distinct computing devices. In such a scenario, the functionality of the remote agents (110) may be performed by multiple different computing devices without departing from the invention.

In one or more embodiments of the invention, the remote agents (110) provide services to virtual machines. The services may include storing virtual machine data, generating backups of the virtual machines, and/or performing restorations of virtual machines.

In one or more embodiments of the invention, the remote agents (110) provide the aforementioned services by performing backup or restoration workflows. Doing so may generate a backup that is usable for restoration purposes or restore a virtual machine to a previous state, respectively. The steps in the aforementioned workflows may be governed by policies. Each workflow may include any number of steps. Different workflows may include different numbers and different types of steps.

In one or more embodiments of the invention, the remote agents (110) may perform different types of workflows for restoring virtual machines depending on the importance, or other characteristic, of each virtual machine. For example, a first type of restoration workflow may result in a restored virtual machine executing on a production host that utilizes storage resources of the production host. The first type of restoration workflow may be performed for low importance virtual machines. In another example, a second type of restoration workflow may result in a restored virtual machine executing on a production host that utilizes storage resources of a backup storage. The second type of restoration workflow may be performed for high importance virtual machines. In contrast to the first type of restoration workflow, the second type of restoration workflow may be completed more quickly. The second type of restoration workflow may result in a virtual machine referred to as an instant access virtual machine.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the backup storages (120) described through this application and all, or a portion, of the methods illustrated in FIG. 4A-4D. For additional details regarding computing devices, See FIG. 6.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) may be distributed devices that include components distributed across a number of separate and/or distinct computing devices. In such a scenario, the functionality of the backup storages (120) may be performed by multiple different computing devices without departing from the invention.

In one or more embodiments of the invention, the backup storages (120) store data from the production hosts (130). The data may be, for example, backups of virtual machines. In one or more embodiments of the invention, a backup of a virtual machine is a data structure that reflects a state of a virtual machine at a predetermined point in time or changes to a state over a period of time. For example, a backup of a virtual machine may be an image of the virtual machine, a differencing disk of the virtual machine, a log of an application executing on the virtual machine, or other types of data structures. An image of a virtual machine may include all of the virtual machine data at a point in time. A differencing disk may be the changes made to virtual machine data over a period of time. A log may be changes made to application data made over a period of time. The backup of a virtual machine may be other types of data structures that may be used to restore a virtual machine to a previous state without departing from the invention.

Multiple backups of varying types may be used to restore a virtual machine to a previous state. These multiple backups may be referred to as a continuity chain. Each backup of the continuity chain may be usable in combination with other members of the continuity chain for restoration purposes. For example, a virtual machine image may be used to restore a virtual machine to a state of the virtual machine at the time the image was generated. In another example, a virtual machine image and a differencing disk for a period of time immediately following the point in time associated with the image may be used to restore a virtual machine to a state of the virtual machine at the end of the period of time following the point in time.

In such a scenario, the virtual machine image and differencing disk may form a continuity chain. In one or more embodiments of the invention, a continuity chain is a number of backups that are each associated with different periods of time that form a continuous lineage, e.g., the periods of time associated with the backups cover a continuous portion of a timeline. For example, a first backup may be associated with May 12 and a second backup may be associated with May 13-May 17. Thus, the combination of the first backup and the second backup cover the period of May 12-May 17. The backups may be used to restore the virtual machine to any point in time between May 12 and May 17. The backup storages (120) may store additional or different data from backups of virtual machines without departing from the invention.

To perform a restoration of a virtual machine, multiple backups of a continuity chain may be combined to obtain a virtual machine image that reflects a state of the virtual machine at a desired point in time. In one or more embodiments of the invention, the backup storages (120) may send the obtained virtual machine image to a production host when generating a virtual machine. In one or more embodiments of the invention, the backup storages (120) may store the obtained virtual machine image locally and provide access to the stored virtual machine image to a production host that host an instant access virtual machine that utilizes the obtained virtual machine image.

In one or more embodiments of the invention, portions data stored in the backup storages (120) is stored in a deduplicated storage. A deduplicated storage may attempt to increase the quantity of data that it can store by only storing copies of unique data. When storing data in a deduplicated storage, the data may first be checked to determine whether it is duplicative of data already stored in the backup storage. Only the unique portions of the data may be stored in the backup storage. Storing and accessing data in a deduplicated storage may be significantly more computing resource costly than storing data in a non-deduplicated storage.

In one or more embodiments of the invention, the virtual machine images used by instant access virtual machines are stored in an instant access storage, e.g., a portion of a persistent storage that does not store deduplicated data. In contrast to a deduplicated storage, the instant access storage may be computationally inexpensive for data storage and access purposes. For additional details regarding backup storages, See FIG. 3.

Figure 2A:
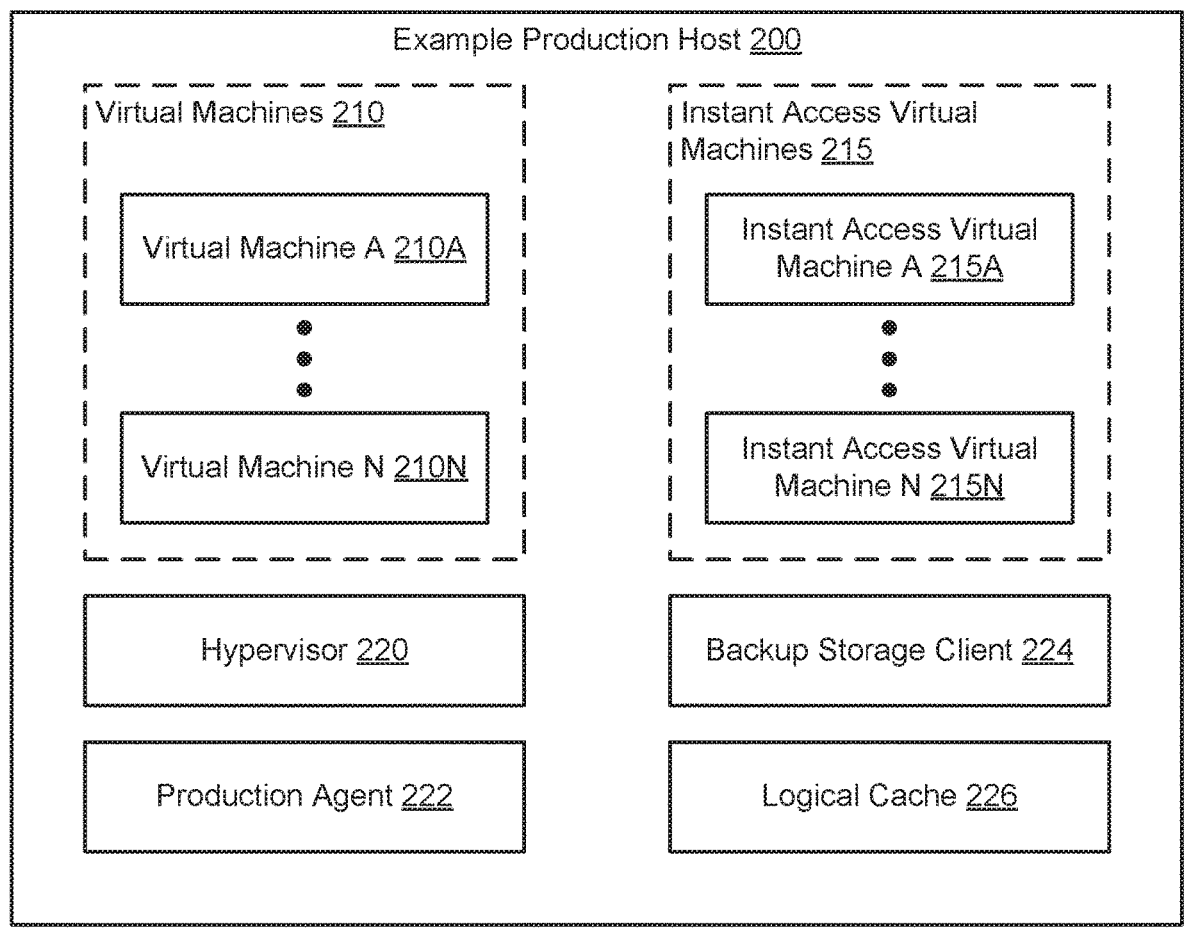
FIG. 2A shows a diagram of an example production host in accordance with one or more embodiments of the invention.

As discussed above, the backup storages may store data obtained from the production hosts (130). FIG. 2A shows a diagram of an example production host (200) in accordance with one or more embodiments of the invention.

In one or more embodiments of the invention, the example production host (200) hosts virtual machines (210) and instant access virtual machines (215). The example production hosts (200) may host any number of virtual machines (210A, 210N) and instant access virtual machines (215) without departing from the invention.

In one or more embodiments of the invention, the virtual machines (210) execute using computing resources of the example production host (200). For example, each of the virtual machines (210) may be allocated a portion of the processing resources, memory resources, and/or storage resources of the example production host (200).

In one or more embodiments of the invention, the instant access virtual machines (215) execute using computing resources of the example production host (200) and computing resources of a backup storage. The instant access virtual machines (215) may execute using storage resources of the backup storage. The instant access virtual machines (215) may execute using computing and memory resources of the example production host (200). For example, each of the instant access virtual machines (215) may be allocated a portion of the processing resources and memory resources of the example production host and a portion of the storage resources a backup storage. In one or more embodiments of the invention, the instant access virtual machines (215) may not utilize storage resources of the example production host (200) for storing a copy of its virtual machine image.

In one or more embodiments of the invention, the instant access virtual machines (215) may access the storage resources of the backup storage via a backup storage client (224). The backup storage client (224) may be an executing entity that provides remote storage access to the backup storage. The backup storage client (224) may enable the storage resources of the backup storage to be mounted in the example production host (200) and, thereby, enable executing entities of the example production host (200) to access these storage resources. For example, the backups storage client (224) may utilize Data Domain Boost Filesystem to mount the storage resources of the backup storage.

In one or more embodiments of the invention, the instant access virtual machines (215) may not utilize storage resources of the example production host (200) for storing its differencing disk. In one or more embodiments of the invention, as data is written to the instant access virtual machines (215), it is stored in a logical cache (226). The data in the logical cache (226) may be transferred to a backup storage that stores the virtual machine image of the respective instant access virtual machine. In one or more embodiments of the invention, the transfer of data from the logical cache (226) to the backup storage is optimized for sequential write purposes.

In one or more embodiments of the invention, the logical cache (226) is a logical entity that utilizes computing resources of the example production host (200). The logical cache (226) may be implemented in memory and/or storage. In one or more embodiments of the invention, the logical cache (226) stores data to be written to a differencing disk and/or data that was previously written to the differencing disk or data that is a portion of a virtual machine image stored on a backup storage. For example, to improve read access of stored virtual machine data of an instant access virtual machine, copies of portion of the virtual machine data stored in the backup storage may be stored in the logical cache. The copied data stored in the logical cache (226) may be selected in any manner, e.g., frequency of access, specified by an administrator or other user, statistical analysis indicates significance, etc.

In one or more embodiments of the invention, an image of each of the virtual machines (210) at points in time in the past may be stored, i.e., stored locally on a production host hosting the respective virtual machine. Following the points in time in the past, a differencing disk that stores each of the changes made from the image of each of the virtual machines (210) may be stored. The aforementioned images and differencing disks may be stored locally or in a backup storage. In contrast, images and differencing disks of the instant access virtual machines (215) may be stored in backup storage.

In one or more embodiments of the invention, logs associated with applications hosted by the virtual machines (210) and/or instant access virtual machines (215) may be generated. A log may reflect changes to application data. Logs may be used in combination with virtual machine images and/or differencing disks to restore virtual machines to predetermined states and/or applications to predetermined states. The logs of applications hosted by instant access virtual machines (215) may be stored in backup storage while the logs of applications hosted by virtual machines (215) may be stored locally before being transferred to backup storage for long term storage.

In one or more embodiments of the invention, generating a backup of a virtual machine (210) includes storing a copy of the image of the virtual machine, a differencing disk, and/or a log of one or more applications hosted by the virtual machine in a backup storage after local generation. Thus, when performing a restoration of a virtual machine, the differencing disks and/or logs may be merged with a virtual machine image to obtain a representation of the virtual machine and/or application at the point in time following the periods of time reflected by each of the differencing disks and/or logs. In contrast, generating a backup of an instant access virtual machine (215) includes storing the copy of the image of the virtual machine, differencing disk, and/or log directly in backup storage, i.e., not locally before transfer.

In one or more embodiments of the invention, the example production host (200) includes a hypervisor (220) that manages the execution of the virtual machines (210) and instant access virtual machines (215). The hypervisor (220) may instantiate and/or terminate any of the virtual machines (210). The hypervisor (220) may also allocation computing resources of the production host (200) to each of the virtual machines (210, 215). For additional details regarding computing resources utilized by virtual machines and instant access virtual machines, See FIG. 2B.

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

The example production host (200) may include a production agent (222) that manages the storage of virtual machine data, e.g., images, differencing disks, and logs, in a backup storage. For additional details regarding virtual machine data, See FIG. 2C. The production agent (222) may issue commands to the hypervisor (220) to control the operation of a virtual machine (210, 215) when attempting to store virtual machine data. For example, the production agent (222) may initiate the processes of generating a backup package, i.e., data that reflects a state of an entity and enables the entity to be restored to the state, for a virtual machine, an application, or other entity executing on the example production host (200). Similarly, the production agent (222) may initiate restorations of virtual machines, applications, or other entities.

In one or more embodiments of the invention, the production agent (222) is a hardened entity, i.e., not modifiable by an entity that is remote to a production host on which the production agent (222) is executing. The production agent (222) may have a set, finite number of predefined functions that may be invoked by a remote entity. In one or more embodiments of the invention, the production agent (222) is not configurable by modifying settings or associated configuration files via a remote terminal or other configuration utility.

In one or more embodiments of the invention, the production agent (222) is a hardware device including circuitry. The production agent (222) may be, for example, digital signal processor, a field programmable gate array, or an application specific integrated circuit. The production agent (222) may be other types of hardware devices without departing from the invention.

In one or more embodiments of the invention, the production agent (222) is implemented as computing code stored on a persistent storage that when executed by a processor performs the functionality of the production agent (222). The processor may be hardware processor including circuitry such as, for example, a central processing unit or a microcontroller. The processor may be other types of hardware devices for processing digital information without departing from the invention.

Figure 2B:
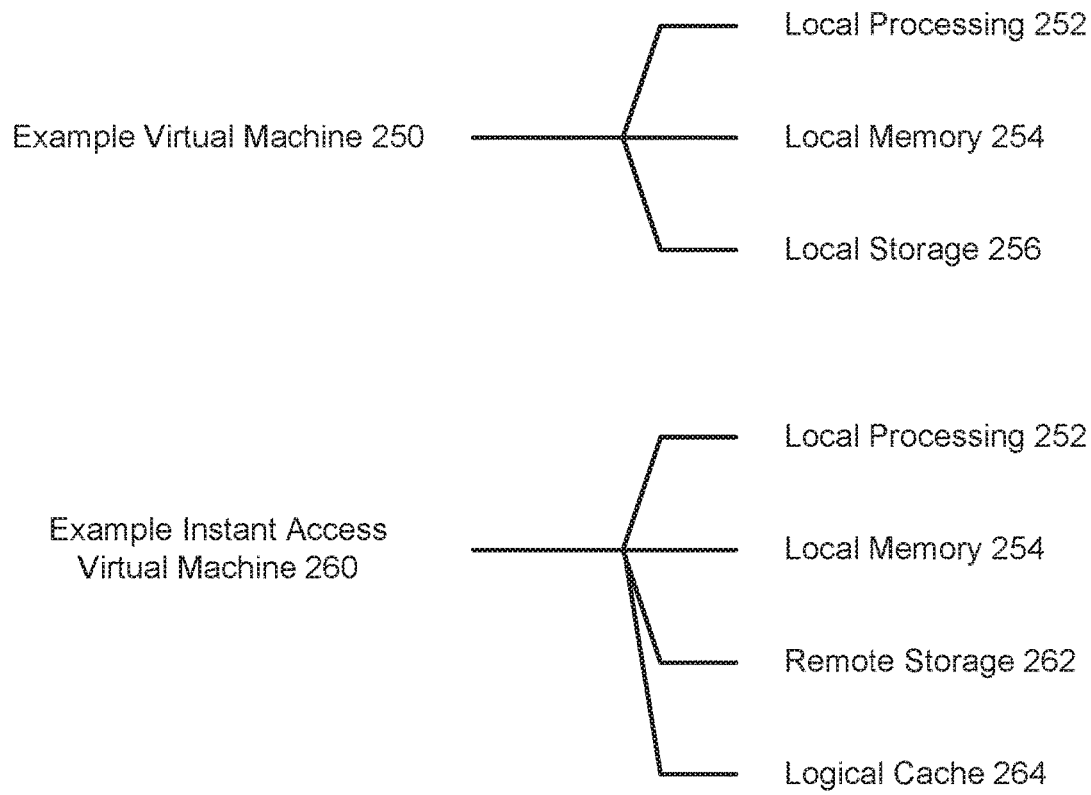
FIG. 2B shows a diagram of relationships between components of the system of FIG. 1 in accordance with one or more embodiments of the invention.

As noted above, virtual machines may utilize different types of computing resources. FIG. 2B shows a relationship diagram illustrating the resources consumed by different types of virtual machines in accordance with one or more embodiments of the invention. As seen from FIG. 2B, an example virtual machine (250) consumes resources such as local processing (252), local memory (254), and local storage (256) resources. In one or more embodiments of the invention, a local resources is a computing resources of a computing device hosting an executing entity. For example, a computing resources of a production host that hosts the example virtual machine (250) may be local resources.

Like the example virtual machine (250), the example instant access virtual machine (260) consumer computing resources such as local processing (252) and local memory (254). However, the example instant access virtual machine (260) also consumes remote storage (262) and logical cache (264). In one or more embodiments of the invention, the remote storage (262) is storage resources of a backup storage that stores backup data for the example instant access virtual machine (260). In other words, an example instant access virtual machine (260) consumes storages resources of a backup storage for storing backup data and for providing storage, e.g., storage that host a virtual machine image that is in use and a differencing disk that is in use. The backup data may not generally be in use except when retrieved for restoration purposes.

Figure 2C:
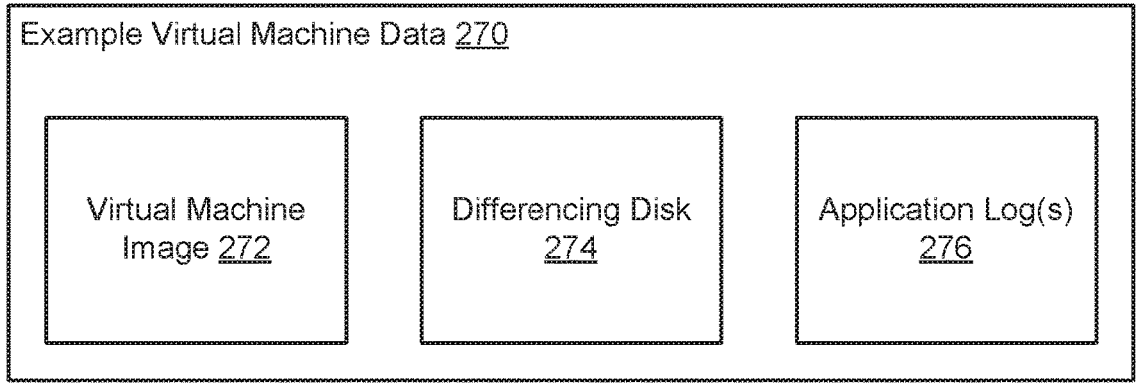
FIG. 2C shows a diagram of an example of virtual machine data in accordance with one or more embodiments of the invention.

FIG. 2C shows a diagram of example virtual machine data (270) in accordance with one or more embodiments of the invention. As noted above, virtual machine data may be stored in backup storage for restoration purposes. The example virtual machine data (270) may include a virtual machine image (272), a differencing disk (274), and application log(s) (276). Each of these backups may be used for restoration purposes of a virtual machine associated with the virtual machine data. When stored in a backup storage, the aforementioned virtual machine data may be referred to as backup data.

For virtual machines, the virtual machine data (270) may be generated locally, stored locally, and then transferred to backup storage. For instant access virtual machines, the virtual machine data (270) may be generated locally and stored in backup storage, i.e., not stored locally. In one or more embodiments of the invention, the virtual machine data (270) may be stored in a local logical cache as it is generated and stored in backup storage in discrete chunks. Doing so may enable writing of the backup storage to be optimized based on the underlying storage architecture of the backup storage. For example, it may be advantageous, e.g., more efficient, to store discrete chunks of data of a predetermined size rather than streaming the generated virtual machine data to the backup storage for storage immediately upon generation. As noted above, because the backup storage may implement a deduplicated storage it may be computationally expensive to storage data in backup storage in some cases. Accordingly, caching the virtual machine data (270) as it is generated and sending discrete chunks to backup storage for storage may provide an improved distributed system that consumes fewer resources when storing data.

While illustrated as including a limited number of backups, the example virtual machine data (270) may include any number and type of backups without departing from the invention.

Figure 3:
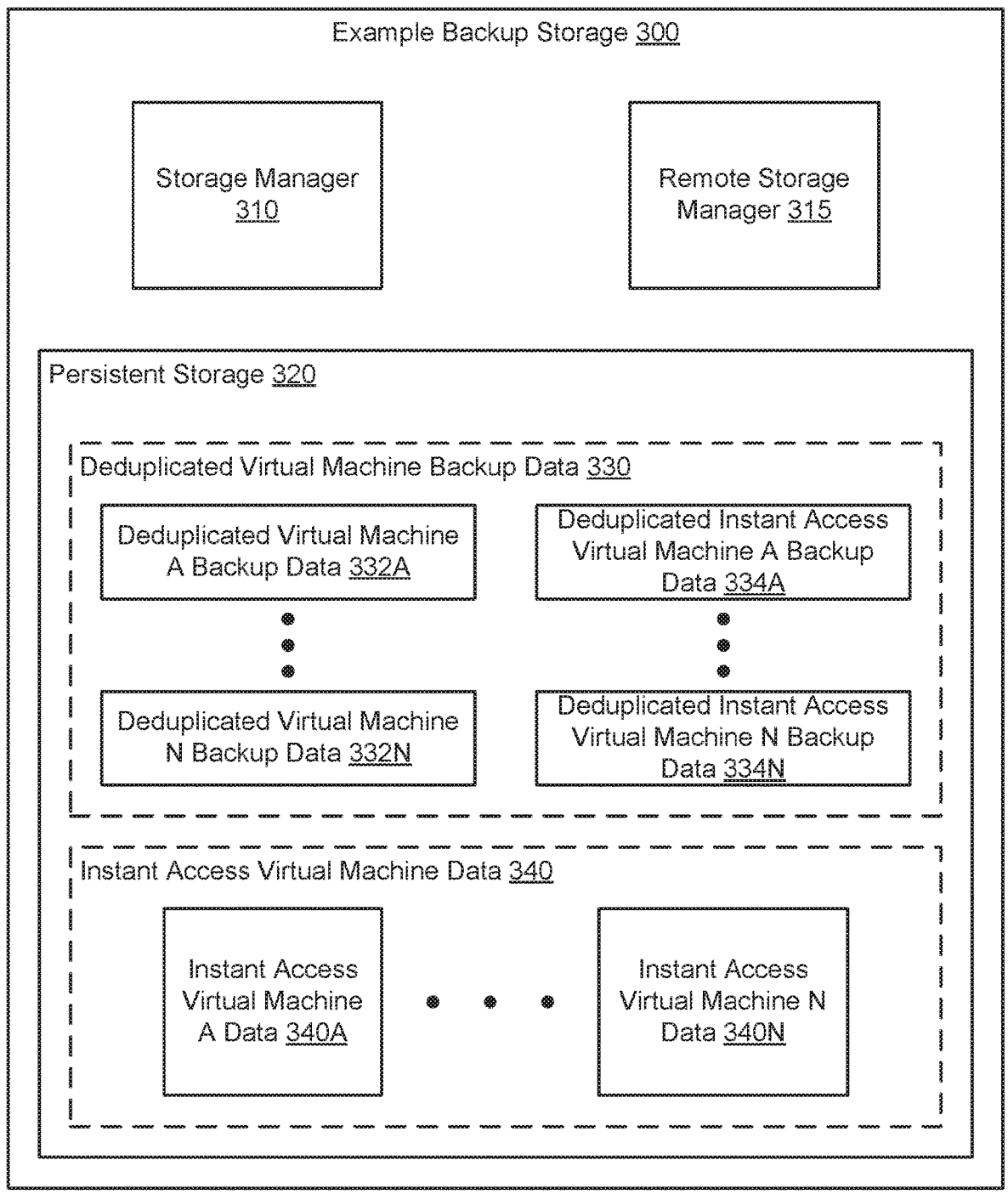
FIG. 3 shows a diagram of an example backup storage in accordance with one or more embodiments of the invention.

When generating a backup or performing a restoration of a virtual machine, a remote backup agent may store or access data in a backup storage. FIG. 3 shows a diagram of an example backup storage (300) in accordance with one or more embodiments of the invention.

In one or more embodiments of the invention, the example backup storage (300) stores data from remote agents or other entities. For example, a remote agent may send data to the example backup storage (300) for storage. In some cases, an example backup storage (300) may store data obtained from a production host. Similarly, the example backup storage (300) may store data from itself in cases where the example backup storage (300) provides storage services to instant access virtual machines. In such scenarios, the remote agent may orchestrate the process, i.e., instructs the production host to store the data in the example backup storage (300). The data may be, for example, virtual machine data (e.g., 270, FIG. 2B).

In one or more embodiments of the invention, the example backup storage (300) provides previously stored data to remote backup agents or other entities. For example, a remote backup agent may initiate a restoration of a virtual machine. The remote backup agent may send an instruction to the example backup storage (300) or the computing device where the restoration of the virtual machines will be performed to provide or obtain, respectively, data in the example backup storage (300). The obtained data may be used to perform the restoration.

In one or more embodiments of the invention, the example backup storage (300) provides storage services to instant access virtual machines. To do so, the example backup storage (300) may retrieve deduplicated virtual machine data, regenerate the original virtual machine data, and generate a virtual machine image and/or differencing disk. The virtual machine image and/or differencing disk may be stored in an instant access storage and access to the virtual machine image and/or differencing disk may be provided to a corresponding instant access virtual machine by a remote storage manager (315), discussed in greater detail below.

To provide the aforementioned functionality, the example backup storage (300) may include a storage manager (310), a remote storage manager (315), and a persistent storage (320) storing data structures used by the storage manager (310) and remote storage manager (315).

In one or more embodiments of the invention, the storage manager (310) manages the storage of data in and the retrieval of data from the persistent storage (320). In other words, virtual machine data for virtual machines and instant access virtual machines may be stored in the persistent storage (320). In one or more embodiments of the invention, the virtual machine data stored in the persistent storage (320) may be deduplicated before storage, e.g., deduplicated virtual machine A backup data (332) and deduplicated instant access virtual machine A backup data (334). In such a scenario, the storage manager (310) may compare to-be-stored data to already stored data and only store unique portions of the to-be-stored data. A unique portion may be a portion of the to-be-stored data that is not duplicative of data already stored in the persistent storage (320). For example, after storing a first draft of a text document in the persistent storage (320), minor changes may be made to the first draft. When the first draft is then stored again in the persistent storage (320), the storage manager (310) may only store the portions of the first draft that were changed. Thereby, more data may be stored in the persistent storage (320) when compared to storing data in the persistent storage (320) without performing deduplication of the data. Deduplication consumes significant computing resource including processing cycles, memory cycles, and/or storage input-output.

Figure 4A:
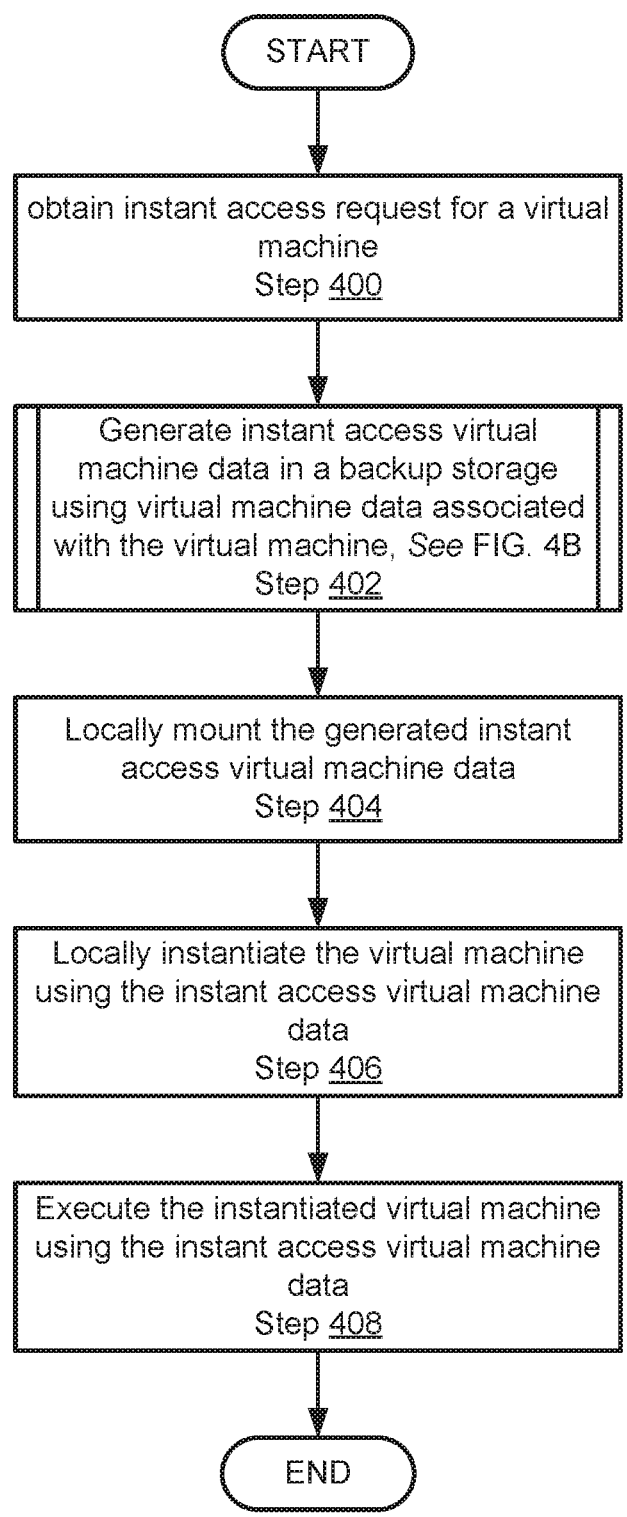
FIG. 4A shows a flowchart of a method of hosting virtual machines in accordance with one or more embodiments of the invention.
Figure 4B:
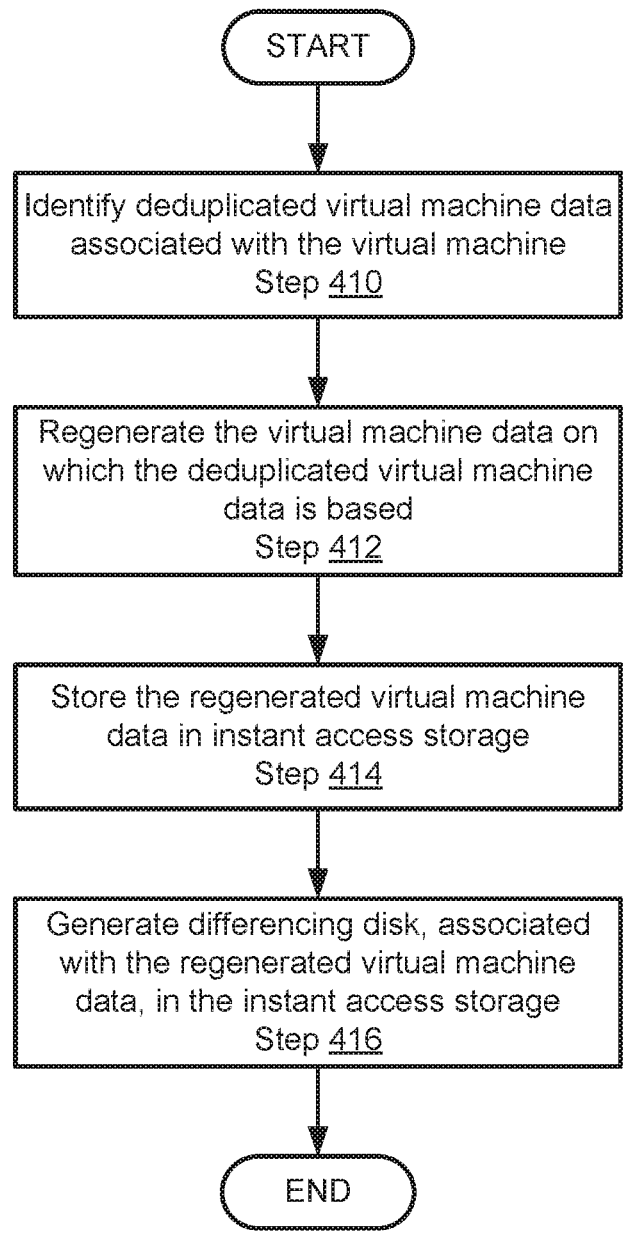
FIG. 4B shows a flowchart of a method of generating instant access virtual machine data in accordance with one or more embodiments of the invention.
Figure 4C:
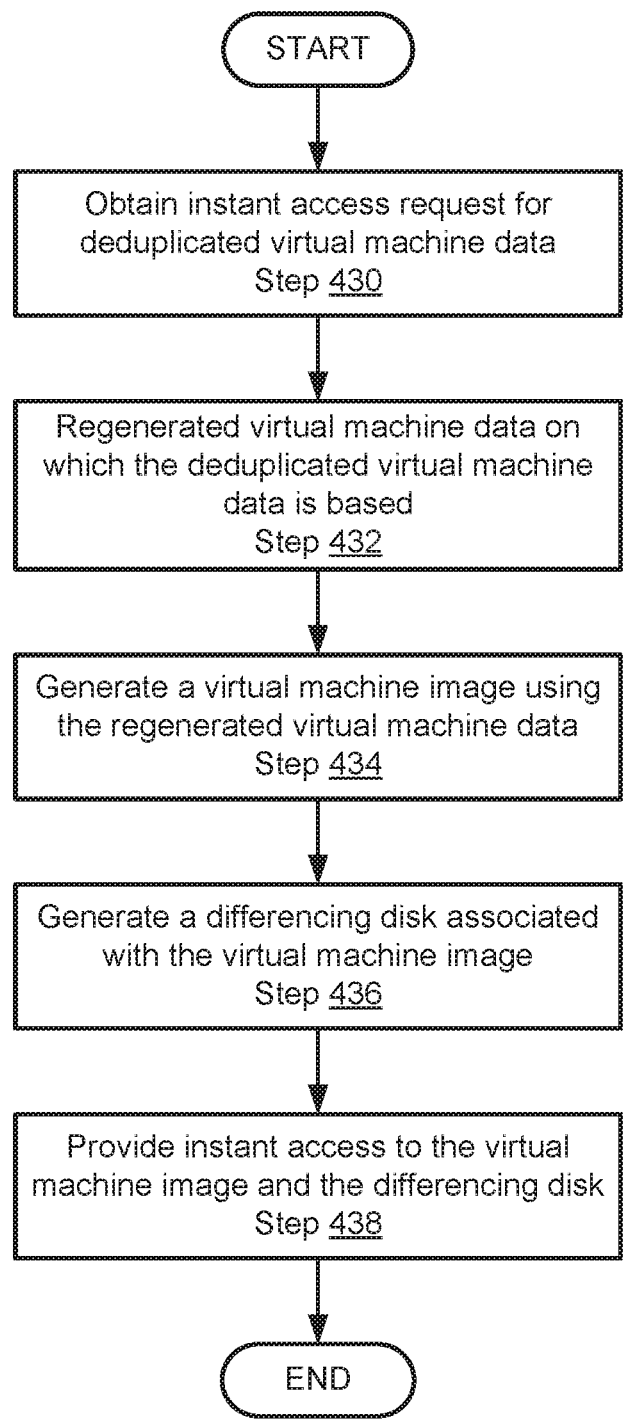
FIG. 4C shows a flowchart of a method of providing instant access to virtual machine data in accordance with one or more embodiments of the invention.

To provide the aforementioned functionality, the storage manager (310) may perform all, or a portion, of the method illustrated in FIG. 4A-4C.

In one or more embodiments of the invention, the storage manager(310) is a hardware device including circuitry. The storage manager (310) may be, for example, a digital signal processor, a field programmable gate array, or an application specific integrated circuit. The storage manager (310) may be other types of hardware devices without departing from the invention.

In one or more embodiments of the invention, the storage manager (310) is implemented as computing code stored on a persistent storage that when executed by a processor performs the functionality of the storage manager (310). The processor may be hardware processor including circuitry such as, for example, a central processing unit or a microcontroller. The processor may be other types of hardware devices for processing digital information without departing from the invention.

In one or more embodiments of the invention, the remote storage manager (315) orchestrates providing access to virtual machine data to instant access virtual machines. To do so, the remote storage manager (315) may coordinate with remote storage clients executing on production hosts to ensure timely access to the data. When a request for access to virtual machine data is received by the remote storage manager (315), the remote storage manager (315) may request that the virtual machine data be retrieved from deduplicated data stored in the persistent storage (320) by the storage manager (310). Once retrieve, the remote storage manager (315) may regenerate the virtual machine data and merge the data to obtain a virtual machine image of the instant access virtual machine. The virtual machine image and a differencing disk for the instant access virtual machine may be stored in persistent storage (320).

In one or more embodiments of the invention, the remote storage manager (315) is a hardware device including circuitry. The remote storage manager (315) may be, for example, a digital signal processor, a field programmable gate array, or an application specific integrated circuit. The remote storage manager (315) may be other types of hardware devices without departing from the invention.

In one or more embodiments of the invention, the remote storage manager (315) is implemented as computing code stored on a persistent storage that when executed by a processor performs the functionality of the remote storage manager (315). The processor may be hardware processor including circuitry such as, for example, a central processing unit or a microcontroller. The processor may be other types of hardware devices for processing digital information without departing from the invention.

In one or more embodiments of the invention, the persistent storage (320) is a storage device that stores data structures. The persistent storage (320) may be a physical or virtual device. For example, the persistent storage (320) may include solid state drives, solid state drives, tape drives, and other components to provide data storage functionality. Alternatively, the persistent storage (320) may be a virtual device that utilizes the physical computing resources of other components to provide data storage functionality.

In one or more embodiments of the invention, the persistent storage (320) stores deduplicated virtual machine backup data (330) and instant access virtual machine data (340). The deduplicated virtual machine backup data (330) may include data associated with virtual machines hosted by production hosts (e.g., 332A, 332N) and/or data associated with virtual machines hosted by production hosts that utilize the example backup storage (300) for data storage services (e.g., 334A, 334N). The instant access virtual machine data (340) may include instant access data (e.g., 340A, 340N) utilized by any number of instant access virtual machines. The instant access virtual machine data (340) may reflect the deduplicated instant access virtual machine backup data (334A, 334N). Thus, in one or more embodiments of the invention, the example backup storage stores a deduplicated copy of backup data for instant access virtual machines and the virtual machine data for the instant access virtual machines.

While the example backup storage (300) is illustrated in isolation, multiple backup storage may cooperate to provide services to virtual machines without departing from the invention. For example, in some scenarios multiple backup storages may each include backup data for a virtual machine. An instant access virtual machine may be provided storage resources by any one of the instant access virtual machines. The backup storages, or another entity of the system of FIG. 1 may select a backup storage for providing of the storage resources. Doing so may enable the system to load balance providing storage resources to multiple instant access virtual machines.

Additionally, while discussed with respect to providing access to backup data, the example backup storage (300)

may provide storage services for other types of data without departing from the invention. For example, the example backup storage (300) may store media files for which multiple entities desire access. Each of the multiple entities may be executing different operating systems. By providing access to the data stored in the example backup storage (300), the example backup storage (300) may enable the entities to access the data regardless of whether the entities and the example backup storage (300) are running the same operating system. Thus, embodiments of the invention may provide an operating system agnostic method of restoring data for any number and type of entity.

As discussed above, components of the system of FIG. 1 may perform methods for storing backups of virtual machines and restoring virtual machines, in addition to other functions. FIGS. 4A-4C show methods in accordance with one or more embodiments of the invention that may be performed by components of the system of FIG. 1.

FIG. 4A shows a flowchart of a method in accordance with one or more embodiments of the invention. The method depicted in FIG. 4A may be used to restore a virtual machine in accordance with one or more embodiments of the invention. The method shown in FIG. 4A may be performed by, for example, a remote agent (e.g., 110, FIG. 1). Other components of the system illustrated in FIG. 1 may perform all, or a portion, of the method of FIG. 4A without departing from the invention.

In Step 400, an instant access request for a virtual machine is obtained.

In one or more embodiments of the invention, the instant access request may be obtained from a message received from a client. The instant access request may be obtained from other entities without departing from the invention.

In one or more embodiments of the invention, the instant access request is obtained by identifying failure of a virtual machine. In response to the failure, a remote agent may treat the failure as an instant access request.

In one or more embodiments of the invention, an instant access request is a request for restoration of a virtual machine. The instant access request may be discriminated from other virtual machine instant access requests based on an identifier, or other indicator, included in the instant access request.

In Step 402, instant access virtual machine data in a backup storage is generated using virtual machine data associated with the virtual machine.

In one or more embodiments of the invention, the instant access virtual machine data is generated via the method illustrated in FIG. 4B. The instant access virtual machine data may be generated via other methods without departing from the invention.

In one or more embodiments of the invention, generating the instant access virtual machine data includes generating an image of the virtual machine at a point in time in the past. The point in time in the past may be based on the virtual machine data. The virtual machine data may be stored in the backup storage. The virtual machine data may be deduplicated against other data stored in the backup storage.

In Step 404, the generated instant access virtual machine data is locally mount.

In one or more embodiments of the invention, the generated instant access virtual machine data is locally mounted in a production host that will host the restored virtual machine. The production host may be specified by a restoration policy for the virtual machine. The restoration policy may specify the target restoration location.

In one or more embodiments of the invention, locally mounting the generated instant access virtual machine data provides applications hosted by the production host native access to the generated instant access virtual machine data. Locally mounting may provide access to storage resources of the backup storage including the generated instant access virtual machine data and a differencing disk for the restored virtual machine. Locally mounting may provide native access to additional, different, and/or fewer data structures stored in the backup storage without departing from the invention. In one or more embodiments of the invention, locally mounting provides virtual machines, or other entities executing on the production host, with read write access to the portion of the storage resources of the backup storage.

In Step 406, the virtual machine is locally instantiated using the instant access virtual machine data.

In one or more embodiments of the invention, the virtual machine is locally instantiated in a production host. The production host may be specified by a restoration policy associated with the virtual machine.

In one or more embodiments of the invention, the virtual machine is locally instantiated virtual machine loads executing components of the virtual machine into memory of the production hosts.

In Step 408, the instantiated virtual machine is executed using the instant access virtual machine data to obtain the restored virtual machine.

In one or more embodiments of the invention, executing the instant access virtual machine is performed by initiated execution of all or a portion of the executing components loaded into memory in Step 406.

In one or more embodiments of the invention, after the virtual machine is restored data written to the restored virtual machine is stored in the differencing disk of the backup storage. The written data may be temporarily stored in a local cache of the production host that hosts the restored virtual machine before transfer to the differencing disk.

In one or more embodiments of the invention, the written data is streamed to the local cache. When a predetermined quantity of data is in the local cache, the predetermined quantity of data is transferred to the backup storage and stored in the differencing disk. Storing the data in the differencing disk may include storing the writes as differences, i.e., changes to data over time as opposed to the state of the data at a particular point in time.

The method may end following Step 408.

FIG. 4B shows a flowchart of a method in accordance with one or more embodiments of the invention. The method depicted in FIG. 4B may be used to generate instant access virtual machine data in accordance with one or more embodiments of the invention. The method shown in FIG. 4B may be performed by, for example, a remote agent (e.g., 110, FIG. 1). Other components of the system illustrated in FIG. 1 may perform all, or a portion, of the method of FIG. 4B without departing from the invention.

In Step 410, deduplicated virtual machine data associated with the virtual machine is identified. The deduplicated virtual machine data may be identified by sending an identifier of the virtual machine to a backup storage that stores the deduplicated virtual machine data. The deduplicated virtual machine data may be identified based on associations stored in the backup storage between the virtual machine and the deduplicated virtual machine data.

In Step 412, the virtual machine data on which the deduplicated virtual machine data is based is regenerated.

In one or more embodiments of the invention, regenerating the virtual machine data includes obtaining all of the unique portions of the virtual machine data stored in the backup storage and combining them to obtain the virtual machine data. The backup storage may include recipes, or other data structures, that specify all of the unique portions stored in the backup storage required to regenerate the virtual machine data. The recipes may also specify an order of combining the unique portions to obtain the virtual machine data. The virtual machine data may be regenerated using other methods without departing from the invention.

In one or more embodiments of the invention, the virtual machine data is regenerated by sending a request for regeneration of the virtual machine data to a backup storage that stores the deduplicated virtual machine data. The backup storage may perform the regeneration in response to the request.

In Step 414, the regenerated virtual machine data is stored in instant access storage.

In one or more embodiments of the invention, the instant access storage is persistent storage of the backup storage.

In one or more embodiments of the invention, the regenerated virtual machine data includes a virtual machine image. The virtual machine image may reflect the state of the virtual machine at a desired point in time for restoration purposes.

In one or more embodiments of the invention, the virtual machine image is generated by merging one or more backups of the virtual machine stored in the virtual machine data. Merging may apply changes specified by one or more differencing disks and/or log backups of the virtual machine data to a virtual machine image of the virtual machine data. Doing so may generate a virtual machine image reflecting a state of the virtual machine at a desired point in time.

In Step 416, a differencing disk, associated with the regenerated virtual machine data, is generated in the instant access storage.

In one or more embodiments of the invention, the differencing disk may be a data structure for storing changes, e.g., writes or deletions, to the virtual machine image of the virtual machine data.

The method may end following Step 416.

FIG. 4C shows a flowchart of a method in accordance with one or more embodiments of the invention. The method depicted in FIG. 4C may be used to provide storage services to an instant access virtual machine in accordance with one or more embodiments of the invention. The method shown in FIG. 4C may be performed by, for example, a backup storage (e.g., 120, FIG. 1). Other components of the system illustrated in FIG. 1 may perform all, or a portion, of the method of FIG. 4C without departing from the invention.

In Step 430, an instant access request for deduplicated virtual machine data is obtained.

The instant access request may be obtained from a client, a remote agent, or another entity of FIG. 1.

In Step 432, virtual machine data on which the deduplicated virtual machine data is based is regenerated. The virtual machine data may be regenerated in a manner similar to that of Step 412 of FIG. 4B except that the backup storage may perform the regeneration rather than sending a request to another entity.

In Step 434, a virtual machine image is generated using the regenerated virtual machine data.

In one or more embodiments of the invention, the virtual machine image is generated by merging one or more differencing disks and/or log backups of the virtual machine data with a virtual machine image of the virtual machine data similar to the description of Step 414 of FIG. 4B.

In Step 436, a differencing disk associated with the virtual machine image is generated.

In one or more embodiments of the invention, the differencing disk is stored locally.

In Step 438, instant access to the virtual machine image and the differencing disk is provided to a restored virtual machine on a production host.

In one or more embodiments of the invention, the instant access is provided by allowing the production host to mount storage resources of the backup storage including the virtual machine image and the differencing disk.

The method may end following Step 438.

Following Step 438, the restored virtual machine may write data directly to the backup storage for storage purposes. Similarly, the restored virtual machine may read data directly from the backup storage for access purposes.

While the methods illustrated in FIGS. 4A-4C are illustrated as lists of steps, the steps may be performing in different order, steps may be omitted, and any number of steps may be performed in parallel or a partially overlapping manner without departing from the invention.

Figure 5A:
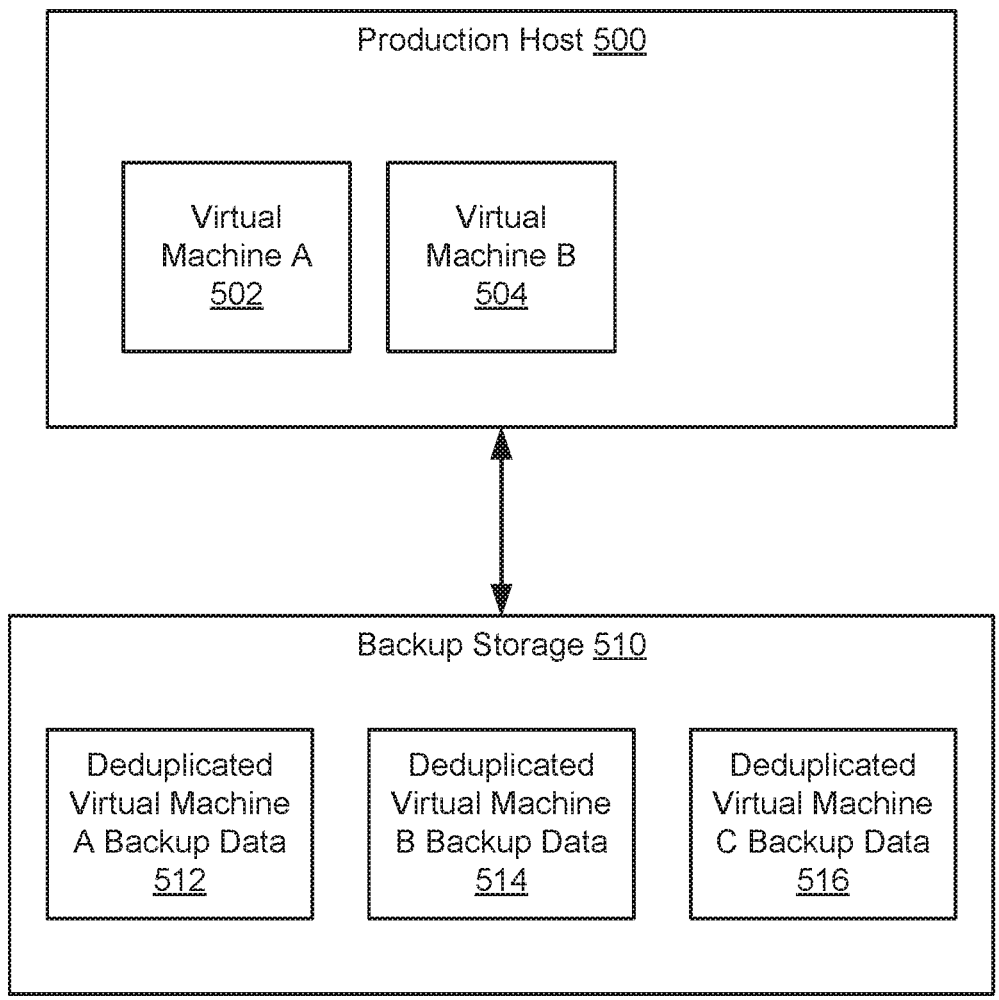
FIG. 5A shows a diagram of an example system at a first point in time.
Figure 5B:
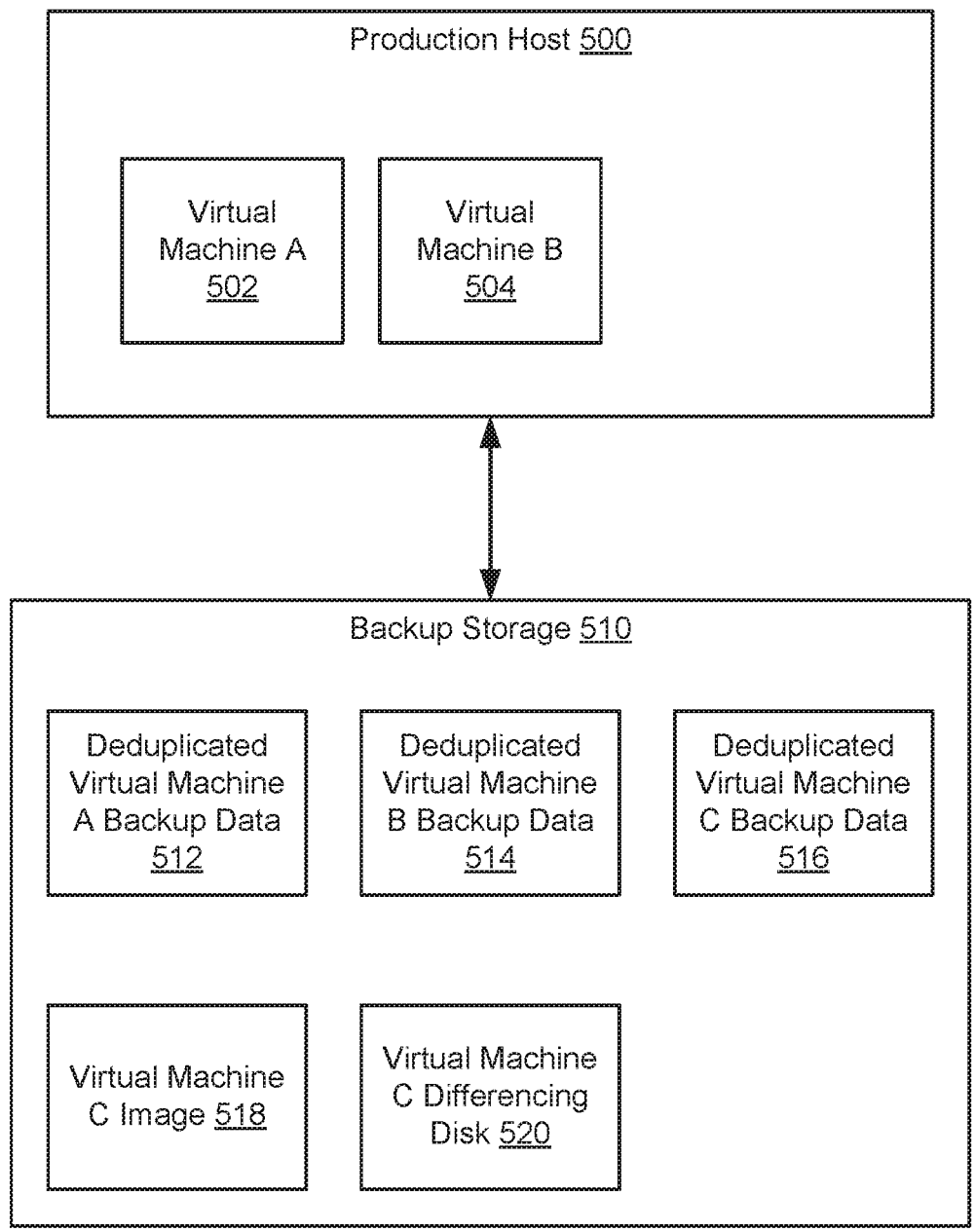
FIG. 5B shows a diagram of the example system of FIG. 5A at a second point in time.
Figure 5C:
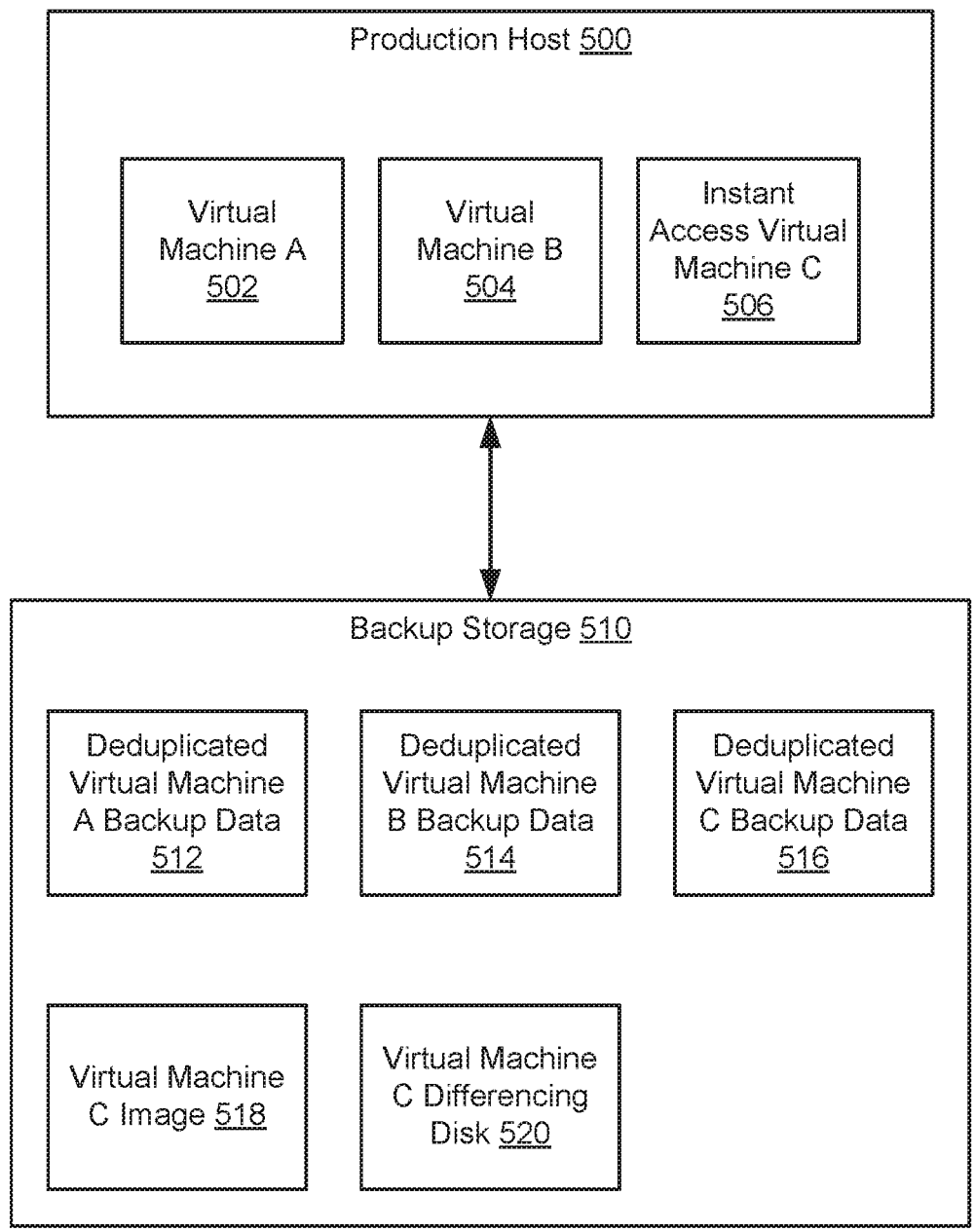
FIG. 5C shows a diagram of the example system of FIG. 5A at a third point in time.

To further clarify embodiments of the invention, a non-limiting example is provided in FIGS. 5A-5C.

Example

Consider a scenario in which a production host (500) illustrated in FIG. 5A hosts two virtual machines (502, 504). For data integrity purposes, deduplicated virtual machine backup data (512, 514) for each of the virtual machines (502, 504) may be stored in a backup storage (510).

The backup storage (510) may also include deduplicated virtual machine backup data (516) for a third virtual machine (not shown) that is not hosted by the production host (500). The third virtual machine may have terminated unexpectedly.

To restore services to clients provided by the third virtual machine, a remote agent (not shown) or other entity of FIG. 1 may initiate a restoration of the third virtual machine as an instant access virtual machine. Doing so may decrease the time required to restore the virtual machine and, thus, returns access to the services provided by the third virtual machine more quickly than performing a traditional virtual machine restoration.

To restore the third virtual machine as an instant access virtual machine, the backups storage (510) generates a virtual machine image (518) and differencing disk (520) as seen in FIG. 5B. The virtual machine image (518) and differencing disk (520) are stored locally on the backup storage (510).

After generating the virtual machine image and differencing disk, access to the aforementioned resources are provided to the production host (500) and an instant access virtual machine (506) is instantiated as shown in FIG. 5C. The instant access virtual machine (506) is restored on the production host (500) using the virtual machine image and differencing disk stored in the backup storage. By doing so, the instant access virtual machine C (506) that serves as a restoration of the third virtual machine is obtained more quickly than would be possible by conventional approaches for performing restorations.

End of Example

Figure 6:
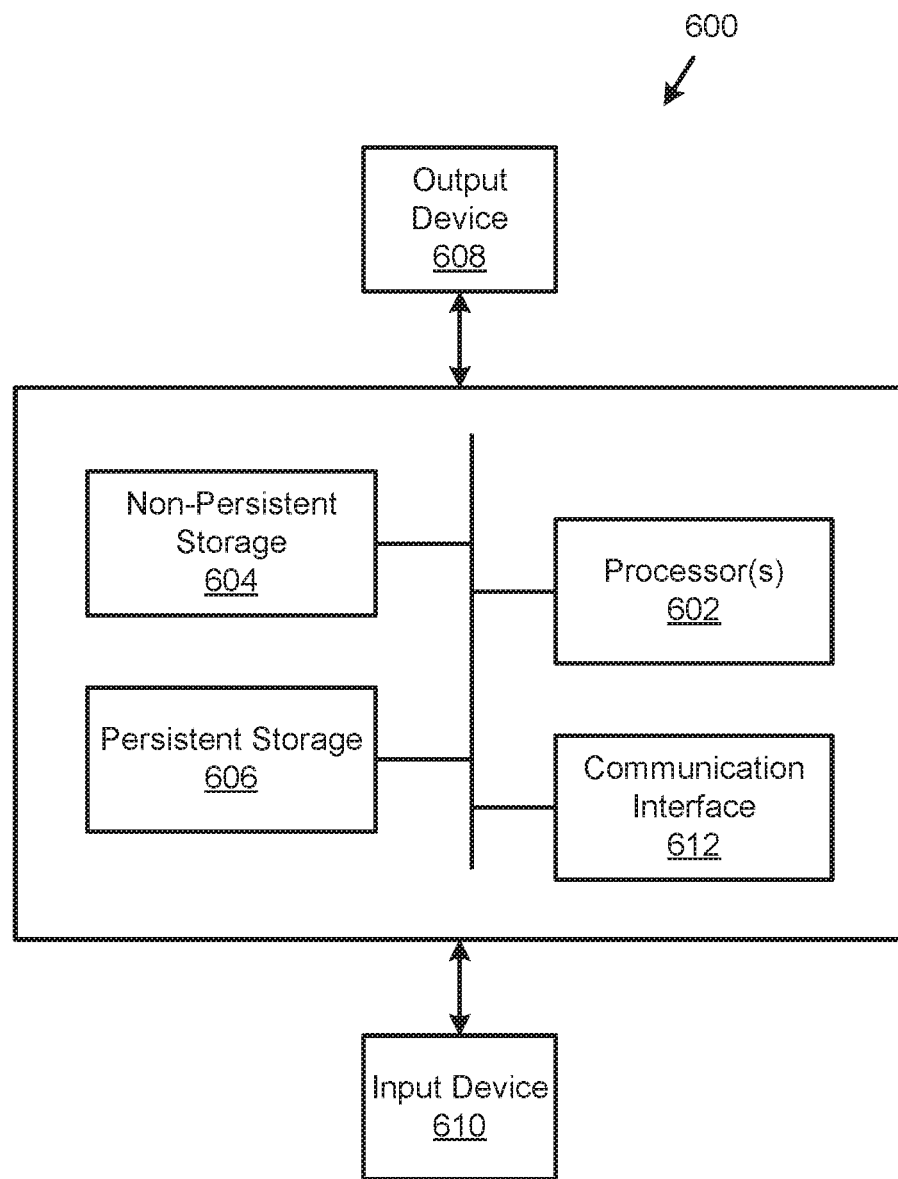
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may provide an improved process of restoring a virtual machine. In comparison to contemporary methods that rely on transferring significant quantities of backup data to a production host, embodiments of the invention provide a method of performing a restoration that does not rely on the transfer of backup data to a production host. In this manner, the computationally expensive portion of performing a restoration including, but not limited to, merging multiple backups and transferring the backups via a network may be performed by a backup storage locally. By doing so, the time required and corresponding computation cost of performing a restoration is substantially decreased.

Further, consider a scenario in which multiple copies of a virtual machine or applications are to be restored. Embodiments of the invention may further reduce the time required for such a procedure by locally generating a virtual machine image and then making multiple local copies for each virtual machine. Instantiating multiple virtual machines at production hosts may require few computing resources because the process of obtaining backup data from a deduplicated storage and merging the obtained data to obtain a virtual machine image need only be performed once at the centralized locations for all of instantiated virtual machines.

Additionally, embodiments of the invention may provide an improved production host access mechanism for accessing virtual machine images and/or differencing disks stored in backup storage. The improved method may include a logical cache that is local to the production hosts. The cache may utilize the resources of any underlying storage, e.g., hard disks, solid state drives, or memory resource, e.g., random access memory, of the production hosts. By caching portion of the virtual machine image and/or differencing disk in the logical cache, the computing resource cost to accessing both may be decreased. By storing data written to virtual machines in the logical cache before sending the written data to the backup storage for storage in differencing disks, embodiments of the invention may provide optimized write for the backup storage that include a preferred quantity of data in each of the writes. Doing so may prevent and/or reduce disk thrashing caused by intermittent, frequent writes of small amounts of data.

In one or more embodiments of the invention, the system of FIG. 1 enables multiple applications to be restored simultaneously by instantiating multiple instances of an instant access virtual machine concurrently. By doing so, embodiments of the invention may enable multi-tiered applications such as, for example, web servers, database servers, or application servers that utilize multiple VMs for their execution to be restored concurrently. Doing so may significantly reduce the time required for providing such services when compared to contemporary methods of virtual machine or application restoration.

In one or more embodiments of the invention, the system of FIG. 1 provides native file transfer protocols to entities that have mounted storage resources of backup storage, or other devices. By doing so, embodiments of the invention may enable different types of computing devices running different types of operating system to directly read and/or write data between them.

Embodiments of the invention may also provide an improved distributed system with improved data integrity when compared to contemporary distributed systems. Because services provided in a distributed system may be necessary for operation of the system, it can be important to ensure that entities providing the services are restored as quickly as possible when their termination is unexpectedly execution. Embodiments of the invention provide a new method of performing a restoration that changes the allocation of computing resources for execution from being local to distributed across the system. In particular, by distributing the storage resources provided to virtual machines across the distributed system, embodiments of the may dramatically reduce the time required for performing or restorations of virtual machines and, consequently, the time required to restore services providing by the virtual machines.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A production host for hosting virtual machines, comprising:
   a persistent storage that stores data associated with a portion of the virtual machines; and
   a backup storage client that provides access to second data associated with a second portion of the virtual machines stored in a backup storage;
   a production agent programmed to:
      identify an instant access request for a virtual machine;
      in response to identifying the instant access request:
         generate instant access virtual machine data in the backup storage using a portion of the second data associated with the virtual machine,
            wherein the portion of data of the second data is stored in the backup storage;
         locally mount the generated instant access virtual machine data;
         locally instantiate the virtual machine using the instant access virtual machine data; and
         execute the instantiated virtual machine using the instant access virtual machine data.

2. The production host of claim 1, further comprising a logical cache that stores a portion of the instant access virtual machine data.

3. The production host of claim 1, wherein the portion of the second data consists of deduplicated data.

4. The production host of claim 3, wherein generating the instant access virtual machine data in the backup storage using the portion of the second data associated with the virtual machine comprises:
   regenerating virtual machine data on which the deduplicated data is based;
   storing the regenerated virtual machine data in instant access storage; and
   generating a differencing disk associated with the regenerated virtual machine data.

5. The production host of claim 4, wherein the instant access virtual machine data comprises an image of the virtual machine.

6. The production host of claim 1, wherein executing the instantiated virtual machine using the instant access virtual machine data comprises:
   obtaining modifications to the virtual machine over time; and
   sending the obtained modifications to the virtual machine for storage in a differencing disk associated with the virtual machine.

7. The production host of claim 6, wherein executing the instantiated virtual machine using the instant access virtual machine data further comprises:
   before sending the obtained modifications:
      caching a portion of the modifications locally.

8. The production host of claim 6, wherein sending the obtained modifications to the virtual machine for storage in the differencing disk associated with the virtual machine comprises:
   obtaining a first portion of the modification from a local cache;
   sending the first portion of the modification to the backup storage;
   obtaining a second portion of the modification from the local cache after sending the first portion of the modifications; and
   sending the second portion of the modifications to the backup storage.

9. A method for hosting virtual machines by a production host, comprising:
   identifying an instant access request for a virtual machine;
   in response to identifying the instant access request:
      generating instant access virtual machine data in a backup storage using a portion of data associated with the virtual machine, wherein the portion of data is stored in the backup storage;
      locally mounting the generated instant access virtual machine data;
      locally instantiating the virtual machine using the instant access virtual machine data; and
      executing the instantiated virtual machine using the instant access virtual machine data.

10. The method of claim 9, wherein local processing resources, local memory resources, and storage resources of the backup storage are used when executing the instantiated virtual machine using the instant access virtual machine data.

11. The method of claim 10, wherein the local processing resources, the local memory resources, and local storage resources are used when executing a virtual machine of the virtual machines.

12. The method of claim 11, wherein local cache resources for the backup storage are used when executing the instantiated virtual machine using the instant access virtual machine data further, wherein the local cache resources are utilized by caching a second portion of the data associated with the virtual machine.

13. The method of claim 9, wherein the portion of the data consists of deduplicated data.

14. The method of claim 13, wherein generating the instant access virtual machine data in the backup storage using the portion of data associated with the virtual machine comprises:
   regenerating virtual machine data on which the deduplicated data is based;
   storing the regenerated virtual machine data in instant access storage; and
   generating a differencing disk associated with the regenerated virtual machine data.

15. The method of claim 14, wherein the instant access virtual machine data comprises an image of the virtual machine.

16. A non-transitory computer readable medium comprising computer readable program code, which when executed by a computer processor enables the computer processor to perform a method for hosting virtual machines by a production host, the method comprising:
   identifying an instant access request for a virtual machine;
   in response to identifying the instant access request:
      generating instant access virtual machine data in a backup storage using a portion of data associated with the virtual machine, wherein the portion of data is stored in the backup storage;
      locally mounting the generated instant access virtual machine data; and
      locally instantiating the virtual machine using the instant access virtual machine data; and
      executing the instantiated virtual machine using the instant access virtual machine data.

17. The non-transitory computer readable medium of claim 16, wherein the portion of the data consists of deduplicated data.

18. The non-transitory computer readable medium of claim 17, wherein generating the instant access virtual machine data in the backup storage using the portion of data associated with the virtual machine comprises:

regenerating virtual machine data on which the deduplicated data is based;

storing the regenerated virtual machine data in instant access storage; and generating a differencing disk associated with the regenerated virtual machine data.

19. The non-transitory computer readable medium of claim 18, wherein the instant access virtual machine data comprises an image of the virtual machine.

20. The non-transitory computer readable medium of claim 16, wherein local processing resources, local memory resources, storage resources of the backup storage, and local cache resources for the backup storage are used when executing the instantiated virtual machine using the instant access virtual machine data; wherein the local processing resources, the local memory resources, and local storage resources are used executing a virtual machine of the virtual machines, wherein the local cache resources are utilized by caching a second portion of the data associated with the virtual machine.

\* \* \* \* \*